United States Patent [19]

Horrocks

[11] 4,060,728

[45] Nov. 29, 1977

[54] METHOD OF MEASURING THE DISINTEGRATION RATE OF BETA-EMITTING RADIONUCLIDE IN A LIQUID SAMPLE

[75] Inventor: Donald L. Horrocks, Placentia, Calif.

[73] Assignee: Beckman Instruments, Inc., Fullerton, Calif.

[21] Appl. No.: 696,003

[22] Filed: June 14, 1976

[51] Int. Cl.$^2$ .............................................. G01T 1/00
[52] U.S. Cl. ................................ 250/328; 250/363 R
[58] Field of Search ......................... 250/328, 363, 366

[56] References Cited

U.S. PATENT DOCUMENTS 3,721,824   3/1973   Bristol .................................. 250/328

Primary Examiner—Harold A. Dixon

Attorney, Agent, or Firm—Robert J. Steinmeyer; Robert R. Meads; John R. Shewmaker

[57] ABSTRACT

A method of measuring the disintegration rate of a beta-emitting radionuclide in a liquid sample by counting at least two differently quenched versions of the sample. In each counting operation the sample is counted in the presence of and in the absence of a standard radioactive source. A pulse height (PH) corresponding to a unique point on the pulse height spectrum generated in the presence of the standard is determined. A zero threshold sample count rate (CPM) is derived by counting the sample once in a counting window having a zero threshold lower limit. Normalized values of the measured pulse heights (PH) are developed and correlated with the corresponding pulse counts (CPM) to determine the pulse count for a normalized pulse height value of zero and hence the sample disintegration rate.

8 Claims, 3 Drawing Figures

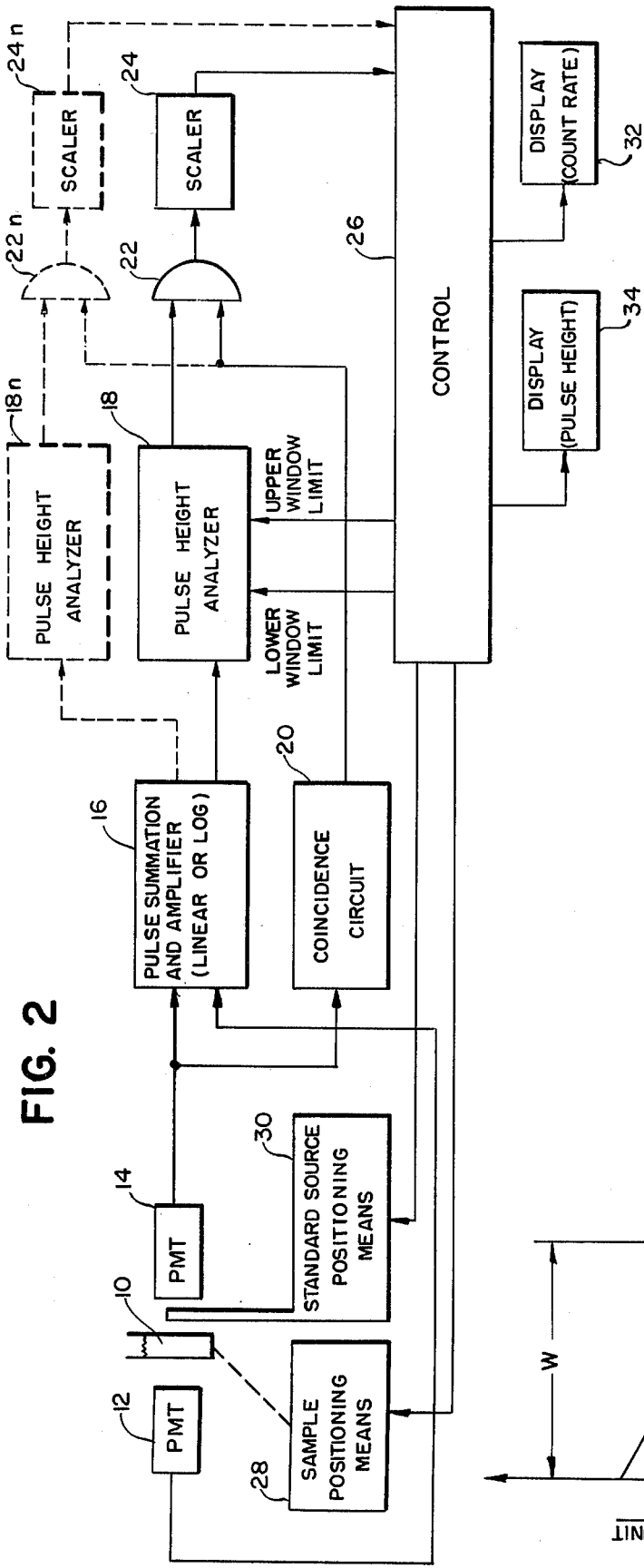
FIG. 2
FIG. 1
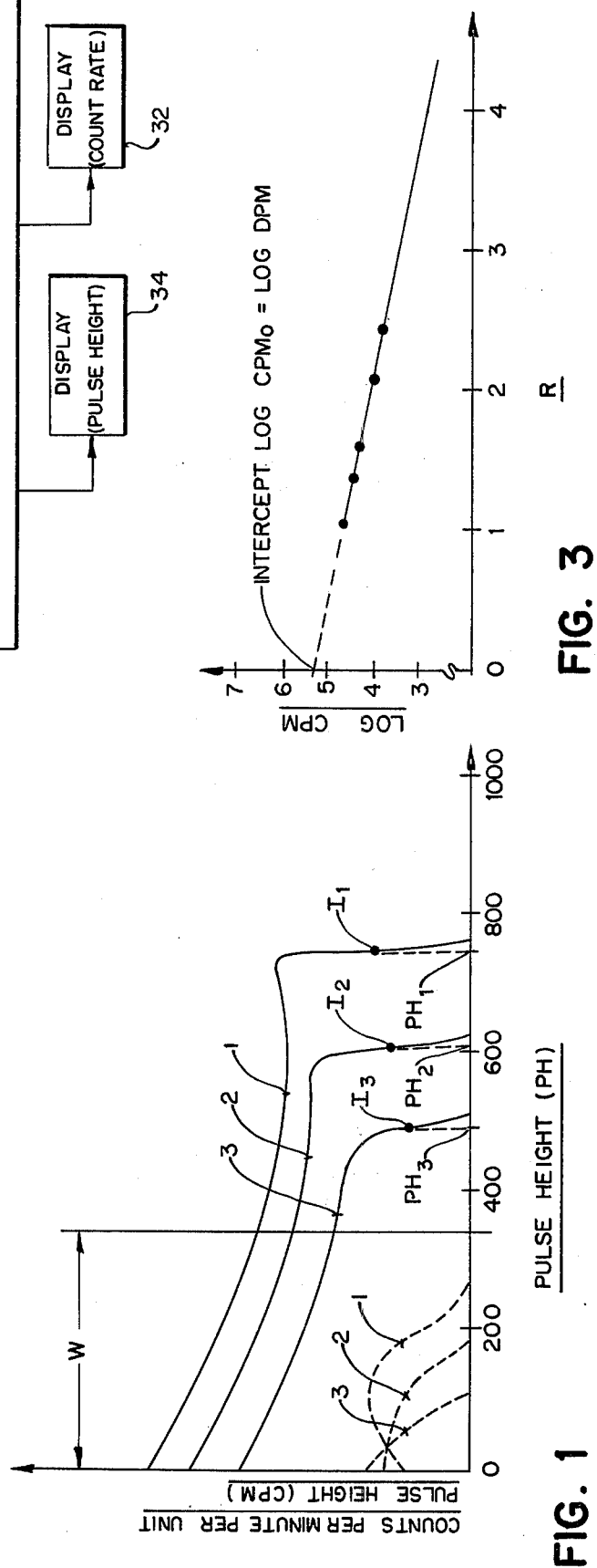
FIG. 3

METHOD OF MEASURING THE DISINTEGRATION RATE OF BETA-EMITTING RADIONUCLIDE IN A LIQUID SAMPLE

BACKGROUND OF THE INVENTION

This invention relates generally to liquid scintillation counting methods and, more particularly, to improvements in methods for measuring the disintegration rate of a beta-emitting radionuclide in a liquid sample.

Liquid scintillation techniques have been widely adopted to measure the count rate or activity of samples containing radionuclides. The radioactive sample, typically a beta emitter, is placed in direct contact with a liquid scintillation medium by dissolving or suspending the sample within the medium. The liquid scintillation medium comprises a solvent or solvents, typically toluene or dioxane, and solute or solutes present in a few percent by weight of the solution. A liquid scintillation solution consisting of the solvent(s), a solute(s), and a radioactive sample are placed within a sample vial for measuring the radioactive emissions within the liquid scintillator. It is theorized that most of the kinetic energy from the nuclear disintegrations of the radioactive sample is absorbed by the solvent and then transferred to the solute which emits photons as visible light flashes or scintillations. The amount of emitted light is proportional to the amount of energy absorbed from the disintegrations. The scintillations are detected by a photomultiplier tube or other light responsive device which converts the energy of each scintillation to a voltage pulse having a pulse height proportional to the energy of the detected scintillation.

To derive a pulse height spectrum of a sample, the output electrical pulses from the photomultiplier are amplified and counted in a plurality of parallel counting channels. Each channel typically includes a pulse height analyzer with discriminators which establish a channel counting "window" having upper and lower pulse height limits. Each counting channel therefore counts the total number of pulses produced having pulse heights within the window limits of the channel. By establishing a plurality of counting channels having window settings which span a range of pulse heights and by counting the number of pulses falling within each channel, a pulse height spectrum is obtained for the particular radioactive sample. Since the output pulse heights from the photomultiplier are proportional to the energy of the corresponding scintillations, the pulse height spectrum corresponds to the energy spectrum of the nuclear radiation emitted by the test sample.

It is well known that radioactive samples or materials present in the scintillation medium can adversely affect the process by which the scintillations are produced. For example the emission of photons can be prevented or emitted photons can be absorbed. Further, some events can be reduced to a level which is below the minimum detection threshold of the photomultiplier. Such effects are commonly referred to as "quenching" and in each case result in a reduction in the number of photons detected by the photomultiplier. When quenching results in a reduction of the level of some events below the detection level of the photomultiplier, the measured count rate will be lower than that produced by the same amount of the radionuclide in an unquenched sample. This is commonly referred to as a decrease in "counting efficiency".

Quenching acts equally on all events produced by the same type of excitation particle, e.g. electron (beta), alpha, proton, etc. Thus if quenching is sufficient to reduce the measured response for one disintegration by a given percentage, it will reduce all given responses by the same percentage. The result is to shift the energy or pulse height spectrum to lower pulse height values, and this is commonly referred to as "pulse height shift".

A major effort has been directed to develop techniques for monitoring the level of quench and for correcting the measured pulse height response to compensate for the effect of quench. Typically, calibration curves which plot counting efficiency vs. the degree of quench are established, where counting efficiency is defined as the observed sample counts divided by the actual disintegrations within the sample. After an unknown sample has been counted and its degree of quench determined, the disintegrations within the sample are calculated from the previously established calibration curves.

In order to generate a standard counting efficiency vs. quench calibration curve, a known set of calibration standards must be counted. This is the accepted practice in present day, highly sophisticated liquid scintillation counters which are designed to count many samples on a high volume basis. When a large number of samples are to be counted, the relative time to preset the instrument and run the calibration standards may be relatively small. However, where a user is only interested in counting one or just a few samples, the time required to preset and calibrate the system may be unacceptably long.

A "double extrapolation" procedure for determining the disintegration rate of a radionuclide in a sample without using a standard solution of the radionuclide to calibrate the counting system is described in Nature, London 202 78 (1964), in Progr. Nucl. Energy, Ser. 9, 7 21–110 (1966), and in *Organic Scintillators and Liquid Scintillation Counting*, p. 687, Academic Press, New York, 1971. In the described procedure, a sample containing a beta-emitting radionuclide is successively quenched either by the addition of quenching agents to the sample solution or by introducing optical filters between the sample and the single phototube included in the counting system. In both cases, the sample and the quenched versions thereof are irradiated with a gamma source to produce Compton scattered electron pulse spectra for the samples in the presence of the source. Next, the pulse height value at one-half of the peak of each spectrum (i.e. the so-called "half-height") is measured and the corresponding pulse height noted. After generation of each pulse spectrum, the count rates for pulses generated from the sample are determined. This is accomplished by counting the sample at various thresholds of pulse height and by extrapolating to a zero threshold in order to obtain the sample count rate at each quench level. Next, the logarithm of the extrapolated count rates are graphically plotted as a function of the relative pulse height for the measured half-heights. A second extrapolation operation is then performed to determine the value of the count rate and hence the disintegration rate at a zero value of relative pulse height.

While it is possible to determine the disintegration rate of a radionuclide in the above manner, the procedure suffers from a number of drawbacks. First, two time consuming extrapolations are required, one to determine the sample count rate at each quench level and another to determine the actual disintegration rate. In addition, measuring the so-called half-height of the Compton spectrum is imprecise and inaccurate. In particular, to measure the half-height, it is first necessary to measure the peak of the Compton spectrum. Such a peak becomes more and more diffuse and difficult to accurately measure as quench increases. Thus, it is necessary to establish a series of adjacent, narrow counting windows to search for the peak and counting must be performed for a long period in each window to obtain statistically valid data for plotting the points defining the peak. Since the half-height is simply the pulse height corresponding to half of the peak height, the half-height is no more accurate than the peak itself.

SUMMARY OF THE INVENTION

The present invention resides in a novel method of measuring the disintegration rate of a beta-emitting radionuclide in a liquid sample in a manner which overcomes the disadvantages of the prior art. The sample is counted at at least two different quench levels. At each level, a zero threshold pulse count is obtained in a single counting step by counting in a window having a zero pulse height threshold detection limit. The sample is also exposed at each quench level to a standard radioactive source for generating a pulse height spectrum, and a pulse height value PH corresponding to a unique point on the spectrum is ascertained. Normalized values R are developed for the respective measured pulse heights PH at each quench level and the normalized values are correlated with the corresponding pulse counts CPM to determine the value of the pulse count $CPM_0$ for a normalized pulse height value of R = zero ($R_0$) and hence to establish the disintegration rate of the radionuclide.

BRIEF DESCRIPTION OF THE DRAWINGS

FIG. 1 is a graphical plot of the pulse height distribution spectra of a radionuclide containing sample at three different levels of quench. The plot is illustrated as counts per unit time interval per unit pulse height (CPM) vs. pulse height (PH). The solid spectra represent a Compton scattered electron distribution generated when the sample is exposed to a standard gamma source. The dashed spectra illustrate the pulse height distribution in the absence of the standard source at the corresponding quench levels.

FIG. 2 is a block diagram of a liquid scintillation counting system for practicing the method of the present invention.

FIG. 3 is a graphical plot of log CPM vs. normalized values (R) of pulse height values PH.

DESCRIPTION OF THE PREFERRED EMBODIMENT

Referring now to the drawings, FIG. 1 illustrates the effect of quenching upon the pulse height spectrum for a particular sample in a liquid scintillation medium. The solid curves, derived for three respective quench levels of the sample, illustrate a Compton scattered electron pulse height spectrum generated by irradiating the sample with a standard source, such as cesium-137. It should be noted that as the degree of quench increases in the sample, the Compton spectrum is shifted to lower pulse height values (to the left in FIG. 1). The extent to which the Compton spectrum is shifted is indicative of the degree of quench in the sample.

The dashed curves in FIG. 1 illustrate the pulse height spectra of the same sample with the same quench levels when the cesium-137 source is returnd to a remote position operatively isolated from the sample. Thus, the dashed curves represent the pulse height spectrum of the sample alone. For increasing degrees of quench, the sample pulse height spectrum is shifted to lower pulse height values in a manner similar to that of the Compton spectrum.

My copending patent application Ser. No. 693,673 filed June 7, 1976, for "Quench Determination in Liquid Scintillating Counting Systems" describes and claims a method and apparatus for determining the degree of quench in a liquid scintillation sample by measuring the pulse height shift of a unique point of the Compton spectrum. Preferably, as described in detail in the application, the inflection point of the leading edge of the Compton spectrum (commonly termed the Compton edge) is located, the inflection point being the location on the edge at which the second derivative is zero. The pulse height value corresponding to the inflection point is ascertained and is compared to the pulse height value determined in a similar manner for a calibration standard. In FIG. 1, the inflection point on the Compton edge of the three Compton spectra is identified by respective labels $I_1$, $I_2$, and $I_3$ and the pulse height values corresponding to the three inflection points are respectively labeled $PH_1$, $PH_2$, and $PH_3$.

The pulse height spectra in FIG. 1 illustrate counts per time interval per unit pulse height (CPM) vs. pulse height (PH). The pulse height axis is labeled in counting window units, arbitrarily from zero to 1000. The counting window units correspond to discriminator divisions, as employed in a pulse analyzer, for example, for setting upper and lower limits of a counting channel window by adjusting the discriminator settings of the analyzer. Alternatively, in accordance with common practice, the pulse height spectrum can be related to the logarithm of energy in which case the pulse height value expressed in discriminator divisions (D) is a function of the logarithm of the pulse height (PH), i.e. $D = a + b \log PH$.

When the degree of quench in a sample is established, for example by measuring the pulse height shift of the inflection point on the Compton edge as described in the aforementioned patent application, the disintegration rate of the sample may be ascertained in a conventional manner by means of standard calibration curves of counting efficiency vs. quench. Having determined the degree of quench, the corresponding counting efficiency is ascertained from the calibration curve, and the disintegration rate is calculated by dividing the measured count rate by the counting efficiency.

Referring now to FIG. 2, there is shown a liquid scintillation counting system adapted to perform the disintegration rate measurements for a beta-emitting radionuclide in accordance with the present invention. The scintillation counter is arranged to measure radioactivity issuing from a sample indicated generally by numeral 10 and comprising a vial disposed within a shielded counting chamber and containing a liquid scintillation solution and sample. A coincidence counter, which includes a pair of photomultiplier tubes 12 and 14, is arranged to detect and convert the light scintillations of the sample to output voltage pulses having amplitudes proportional to the photon energy of each scintillation detected. Each scintillation of the sample is detected by the photomultiplier tubes thereby producing a pair of coincident output pulses for each scintillation.

The output of each photomultiplier tube is coupled as an input to a combined pulse summation circuit and amplifier 16 which prepares the pulses for analysis by pulse height analyzer 18. If a pulse height spectrum related to the logarithm of energy is sought, then amplifier 16 also includes a logarithmic function which operates to supply logarithmic pulses to the analyzer. By summing coincident output pulses from the pair of photomultiplier tubes, and thereby detecting a larger combined pulse than either output pulse, the detection threshold of the system is lowered enabling more pulses to be detected thus improving the signal-to-noise ratio of the system. Moreover, the system resolution is improved, i.e. the uniformity of response between two equal-energy events is improved.

The pulse height analyzer 18 receives the summed and amplified pulses from amplifier 16 and selects pulses within a predetermined energy range or window for measurement and rejects all other pulses. The energy window of the pulse height analyzer is set by adjusting the discriminator settings of the analyzer either manually or automatically in a conventional manner.

The output of each photomultiplier tube is also coupled as an input to a coincident circuit 20 which produces an output signal upon receipt of coincident input pulses. The output signal from the coincident circuit is coupled as a triggering input to a gate circuit 22. Gate circuit 22 has an input terminal for receiving the pulses by the pulse height analyzer 18 and an output terminal for transferring these pulses to a scaler 24 for counting. When a scintillation is detected, the resulting coincident pulses are summed and amplified by amplifier 16 and supplied to pulse height analyzer 18. The coincident pulses are also fed to coincident circuit 20 producing an output signal therefrom which enables gate 22 to pass the pulses from the pulse height analyzer 18 to the scaler 24 for counting by the scaler.

The scintillation counting system is operated by a control 26. The control 26 directs the positioning of the sample 10 in the counting chamber by a conventional sample positioning means 28. The control further actuates conventional external standard positioning means 30 for selectively positioning an external standard source, such as a cesium-137 gamma source, in an operative position for irradiating the sample 10 to generate the Compton pulse height spectrum. It will be appreciated by those skilled in the art that control 26 may be either automatic or manual. In this regard the sample 10 and the external standard source may be manually positioned, if desired. Moreover, the upper and lower window limits of the pulse height analyzer 18 may be adjusted manually in a conventional manner by means of variable potentiometers (not shown) which supply analog voltage signals for establishing the analyzer discriminator settings.

The scintillation counting system of FIG. 2 has been described as incorporating a single counting channel comprising pulse height analyzer 18, gate 22, and scaler 24, for which the window settings of the analyzer are reset to establish each new window in which pulses are to be counted. In more elaborate systems, all conventional in the art, any number of additional parallel pulse height analyzers 18n, gates 22n, and scalers 24n (shown in dashed outline in FIG. 2) may be employed to count in more than one window at the same time. In this regard the system could incorporate a standard multichannel analyzer having, for example, 1000 parallel channels each with a window one discriminator division wide to span the entire pulse height axis of 1000 discriminator divisions. In such a system, counting would be performed in the 1000 windows simultaneously.

The scintillation counter of FIG. 2 further includes displays 32 and 34 of conventional design. Display 32 displays the count rate derived in the counting window set for the pulse height analyzer 18. Display 34 displays the pulse height value PH corresponding to the inflection point I on the Compton edge automatically located and determined in accordance with the methods described in the aforementioned patent application, the methods and apparatus of which are hereby incorporated by reference and included in a preferred form of the present invention.

In accordance with a primary aspect of the present invention, and employing the system of FIG. 2, the disintegration rate of a sample is determined by counting pulses produced only by the radionuclide in the sample for at least two values of sample quench ($CPM_1$ and $CPM_2$) and by analyzing the pulse height spectra for the two differently quenched versions of the sample to determine the pulse height values ($PH_1$ and $PH_2$) associated with a unique point (inflection point) on each of the spectra. Normalized values of the measured pulse heights are developed and correlated with the corresponding count rates $CPM_1$ and $CPM_2$ to establish a count rate ($CPM_0$) at a normalized pulse height value of zero. The value of $CPM_0$ provides a measure of the disintegration rate of the sample.

The control 26 is used to perform the sequence of operations for determining the disintegration rate of a sample in accordance with the method of the invention. In this regard, control 26 first commands the sample positioning means 28 to position the sample 10 into the counting chamber adjacent the photomultiplier detector tubes 12 and 14. As indicated previously, the sample is counted at at least two values of quench. Thus, at the time of introduction for the first counting operation, the sample may be unquenched (i.e. zero quench value). Thereafter, for the second and subsequent counting operations the quench value of the sample is changed. However, it should be understood that the invention can be practiced with the sample 10 initially exhibiting a quench value other than zero.

With the sample in position in the counting chamber, the control 26 actuates external standard control means 30 to position the standard source into operative position adjacent the sample 10 for irradiating the sample and generating a Compton scattered electron distribution for the sample in the presence of the standard source. Control 26 also establishes the upper and lower window limits for the counting channel of pulse height analyzers 18–18n. Thus, the control 26 defines the counting windows for examining the Compton spectrum, locating the inflection point $I_1$, and determining the corresponding pulse height value $PH_1$ for the first measured sample. More particularly, a preferred method for locating the inflection point is described in detail in the aforementioned copending patent application and incorporated herein by reference. Accordingly specific reference should be made to the copending application for a detailed understanding of the method. However, briefly, the inflection point is located by counting in a plurality of windows along the Compton edge and by calculating the first derivative (i.e. the slope of the edge) at spaced points along the edge by subtracting the counts of adjacent counting windows.

When a group of three spaced derivatives is obtained the middle of which is greater than the outer two, the inflection point is thus determined to be between the locations of the outer derivatives. Thereafter, conventional interpolation techniques are employed to determine the exact location of the inflection point $I_1$ between the derivative values. When the inflection point is located, the corresponding pulse height value $PH_1$ is displayed by display 34.

After establishing $PH_1$, the sample is retained in the counting chamber and the control 26 directs the return of the standard source to an inoperative position remote from the counting chamber. Control 26 then sets a pulse height window W in pulse height analyzer 18 for counting the sample alone. Significantly and as illustrated in FIG. 1, window W includes a lower limit which is set at essentially the zero detection threshold of the system. This is a significant and important feature of the present invention which enables single step counting to establish the zero threshold count rate of the radionuclide in the sample. This eliminates the first extrapolation step of the prior "double extrapolation" method. As a result, there is no longer a need to perform the time consuming, plural, and successive counting operations on the sample at different threshold levels and at each quench value and to extrapolate the results of the counting operations to zero threshold.

The upper limit of window W is set a sufficient distance outward on the pulse height axis so that window W includes all the pulses issuing from the sample alone.

Control 26 directs counting of the sample in window W and the measured count rate ($CPM_1$) is displayed by display 32.

After performing the first counting operation on the sample and obtaining the values of $PH_1$ and $CPM_1$, the quench value of the sample is changed and a second operation, identical to the first counting operation, is performed to obtain a corresponding Compton edge pulse height value $PH_2$ and sample count rate $CPM_2$. These values are likewise displayed in a similar manner by displays 32 and 34.

Introduction of the differing quench values of the sample may be done by internal impurity quenching, internal color quenching or external optical quenching. The internal impurity quench method involves the addition of increasing amounts of a chemical to the sample which decreases the scintillation efficiency. The additions can be made successively to the sample or to a series of samples containing the same amount of radionuclide. The internal color quench method involves addition of a chemical which produces a color in the liquid scintillator which varies by the amount of the chemical added. The additions can be made successively to the same sample or to a series of samples containing the same amount of radionuclide. The external optical quench is produced by various materials or filters outside of the sample containing vial which will absorb part of the light emanating from the sample vial.

At this point the sample may be counted one or more additional times for additional different quench values and corresponding PH and CPM values obtained and displayed.

After obtaining the set of pulse height values $PH_1$–$PH_n$, the pulse height values of the set are normalized by deriving normalized values $R_1$–$R_n$ for the corresponding pulse height values. Normalization is an operation which establishes the relative position of the pulse height values with respect to a common pulse height value. Thus, R = common PH value/measured PH value Preferably, the common pulse height value is the first measured value $PH_1$. In such case, $R_1 = PH_1/PH_1 = 1$. Similarly, $R_2 = PH_1/PH_2$. Further, $R_3 = PH_1/PH_3$, and so forth through $PH_n$.

While $PH_1$ is employed as the common value into which all PH values are divided, the common pulse height value need not be $PH_1$ and, in fact, could be any of the meausred PH values. Moreover, the common PH value could be some other pulse height value, not actually measured, as long as this value is within the range of values which the system could measure for the same sample.

After developing the normalized pulse height values $R_1, R_2, \ldots R_n$, the values of R are correlated with the corresponding pulse counts $CPM_1, CPM_2, \ldots CPM_n$. This may be done by graphically plotting log CPM (or CPM linearly if desired) vs. R as illustrated in FIG. 3. When the log CPM is plotted, the plot is a straight line.

The disintegration rate of the sample is determined by extrapolating this plot to the value R = 0 as shown by the dashed extension of the plot in FIG. 3. The intercept of the plot with the log CPM axis (i.e. log $CPM_0$) for R = 0 establishes the logarithm of the sample disintegration rate. Thus, the antilog of such a value determines the sample disintegration rate. Of course, if R is plotted against CPM rather than log CPM, the intersection of the plot with the CPM-axis is the sample disintegration rate.

As thus described, disintegration rate determination by counting pulses produced by the radionuclide in the sample in a zero pulse height threshold detection window and by detecting a unique point on the Compton pulse height spectrum for the sample in the presence of a standard source to establish the corresponding pulse height value, constitutes a new and improved disintegration rate determination method which is free of the drawbacks of the prior methods. In particular, the present method does not require extrapolation of the measured count rate to zero threshold at each level of quench. As a result, a need for a plurality of successive count rate determinations at different threshold levels for each quench value is eliminated. Moreover, the pulse height value PH is accurately determined since the Compton edge inflection point determination establishes a truly unique PH value.

In the foregoing description, the pulse height spectrum has been related directly to the values of energy (FIG 1). Of course, the pulse height spectrum alternatively may be related to the log of energy. In such a case, a logarithmic function is included in amplifier 16. Then the pulse height value expressed in discriminator divisions D is a function of the logarithm of the pulse height PH, i.e. $D = a + b \log PH$ where $a$ is the value of D at which the PH value is one and thus ($b \log PH$) is zero. ($b$) is a constant determined by measuring the pulse height response at a minimum of two known energy values.

For the logarithmic spectrum, R is defined by the equation:

$$R_n = \text{antilog } (D_l - D_n)/b$$

The value of $b$ may be determined by measuring the pulse height response of a known energy sample at a minimum of two known energy values. Such samples could be, for example, tritium or carbon-14. In practice, for tritium, $D_1$ was located by the inflection point of the Compton edge at 478 Kev. $D_2$ was located at the endpoint of the tritium pulse height spectrum at 18.6 Kev. The corresponding discriminator division settings for such values of $D_1$ and $D_2$ were 791 and 438, respectively. Thus, in such an example, $b = D_1 - D_2/(\log 478 - \log 18.6) = 791 - 438/2.679 - 1.270 = 353/1.409 = 250$.

Having obtained the value of $b$, the value of R is calculated for each quenched version of the sample from the equation given previously. Thereafter, a plot of log CPM vs. R is plotted in the manner illustrated in FIG. 3 and the plot is extrapolated to the intercept of the log CPM axis to ascertain the log of the sample disintegration rate.

Practicing the present invention, a tritium containing sample was measured at five different quench values and the corresponding CPM and R values were determined to be:

| Sample | CPM | R |
|---|---|---|
| 1 | 98,111 | 1.086 |
| 2 | 86,582 | 1.343 |
| 3 | 75,341 | 1.614 |
| 4 | 60,666 | 2.032 |
| 5 | 50,626 | 2.421 |

A plot of log CPM vs. R for the foregoing values extrapolates to an intercept value of 5.22734 for log DPM. FIG. 3 illustrates a graphical plot of the foregoing values for the tritium containing sample. The corresponding antilog determines the DPM of the tritium containing sample as being $1.69 \times 10^4$ disintegrations per minute.

It should be appreciated that an actual plotting of the CPM or log CPM vs. R is not essential to establish the intercept value which determines DPM. For example, having collected the foregoing CPM and R values, the straight line equation for log CPM may be expressed by the equation:

$$\log CPM = c + dR$$

Then using the foregoing CPM and R values and the standard "least squares" method, the straight line equation for log CPM converts to:

$$\log CPM = 5.22734 - 0.21696R.$$

In this equation the value of $c = 5.22734$ is the intercept value of the log CPM axis and gives the logarithm of the disintegration rate as above.

While particular methods have been described in detail herein, modifications and changes may be made without departing from the spirit of the present invention as defined by the following claims. For example, while the described methods have included a gamma standard source for irradiating the sample, other sources may be employed for such a purpose. For example, an alpha-emitting radionuclide, such as uranium-233, may be included in the sample vial. Such an alpha source produces a pulse height spectrum having a sharp peak response at a single PH value. Thus, when an alpha source is employed in place of a gamma source, the unique point on the pulse height spectrum may be the peak response. Accordingly, within the scope of the present invention, different PH values corresponding to such peak responses at different quench levels may be normalized and correlated with corresponding CPM values in the manner previously described to ascertain the disintegration rate of the sample.

What is claimed is:

1. A method of measuring the disintegration rate (DPM) of a beta-emitting radionuclide in a liquid sample using a scintillation counting system, comprising the steps of:
   a. exposing the sample to radiation from a standard source and generating a pulse height distribution spectrum for the sample in the presence of the standard source,
   b. detecting a unique point on the spectrum and measuring the corresponding pulse height value ($PH_1$),
   c. counting pulses produced by the radionuclide in the sample ($CPM_1$) in a window bounded on one side by a zero pulse height threshold detection limit for the counting system and bounded on the other side by a limit the value of which at least includes all the pulses produced by the radionuclide in the sample,
   d. developing a quenched version of the sample,
   e. exposing the quenched sample to radiation from the standard source and generating a pulse height distribution spectrum for the quenched sample in the presence of the standard source,
   f. detecting the unique point on the latter spectrum and measuring the corresponding pulse height value ($PH_2$),
   g. counting pulses produced only by the radionuclide in the quenched sample ($CPM_2$) in said window,
   h. developing normalized values ($R_1$, $R_2$) for the measured pulse heights ($PH_1$, $PH_2$), and
   i. correlating the normalized values ($R_1$, $R_2$) with corresponding pulse counts ($CPM_1$, $CPM_2$) to determine the value of the pulse count ($CPM_0$) for a normalized pulse height value of zero ($R_0$).

2. The method of claim 1 wherein the normalized pulse height values are correlated with logarithms of the corresponding pulse counts to determine the value of the logarithm of the pulse count (log $CPM_0$) for a normalized pulse height value of zero ($R_0$) and wherein the log $CPM_0$ is converted to a measure of the disintegration rate of the sample (DPM).

3. The method of claim 2 wherein the normalized pulse height values ($R_1$, $R_2$) are correlated with corresponding values of the logarithms of the pulse counts (log $CPM_1$, log $CPM_2$) to determine the log $CPM_0$ by plotting log CPM vs. R and extrapolating from the plot to a value of log CPM at R equal zero.

4. The method of claim 3 including the further steps of developing one or more additional quenched versions of the sample having different degrees of quench, and repeating steps e) through h) for each quench version to obtain additional points defining the plot of log CPM vs. R.

5. The method of claim 1 wherein the standard source generates a Compton scattered electron pulse height spectrum exhibiting a Compton edge at the high energy end thereof and the unique point determined on the pulse height spectrum is the point at which the second derivative of the Compton edge is zero.

6. The method of claim 1 wherein the normalized pulse height value ($R_2$) for a quenched version of the sample is determined from a ratio of the pulse height $PH_1$ and the pulse height $PH_2$ and wherein the normalized pulse height value for the sample is one (1).

7. The method of claim 1 wherein the generated pulse height spectrums are logarithmic pulse height spectrums, the corresponding pulse height values are functions of logarithms of the pulse heights ($D_1 = a + b \log PH_1$, $D_n = a + b \log PH_n$) and wherein the normalized pulse height values are defined by the expression $$R_n = \text{antilog}(D_1 - D_n)/(b).$$

8. The method of claim 1 wherein the steps of counting pulses include the operations of:
monitoring the sample scintillations with first and second detectors to derive a pair of coincident pulses for each scintillation, summing the coincident pulses, and counting the summed pulses.

* * * * *